US005575660A

United States Patent [19]
Hooks

[11] Patent Number: 5,575,660
[45] Date of Patent: Nov. 19, 1996

[54] AUTOMOTIVE MAINTENANCE INSTRUCTION KIT

[76] Inventor: Angela D. Hooks, 1317 C Kenilwood Way, Bowling Green, Ky. 42104

[21] Appl. No.: 319,462

[22] Filed: Oct. 6, 1994

[51] Int. Cl.⁶ ................................................ G09B 25/02
[52] U.S. Cl. .......................................... 434/374; 434/373
[58] Field of Search ................................... 434/374, 432, 434/373, 372, 375, 376, 379, 401, 403, 365, 219

[56] References Cited

U.S. PATENT DOCUMENTS

| | | | |
|---|---|---|---|
| 2,181,588 | 11/1939 | Purvis | 434/374 |
| 3,990,158 | 11/1976 | Valentine | 434/373 |
| 4,120,118 | 10/1978 | Mathews et al. | 434/373 |
| 5,090,934 | 2/1992 | Quercetti | 434/373 |
| 5,100,621 | 3/1992 | Berke et al. | 434/433 |
| 5,244,394 | 9/1993 | Serabian-Musto | 434/429 |

Primary Examiner—Edgar S. Burr
Assistant Examiner—Anthony H. Nguyen
Attorney, Agent, or Firm—Michael I. Kroll

[57] ABSTRACT

An automotive maintenance instruction kit comprising a miniature scale model automobile with a plurality of removable parts. A set of repair tools, a maintenance and repair manual and a video tape to be inserted into a video player and played on a television set. A person utilizing the above components of the kit can become skilled in removing and installing the removable parts in the miniature scale model automobile, so that the person can apply this skill to a real automobile.

1 Claim, 3 Drawing Sheets

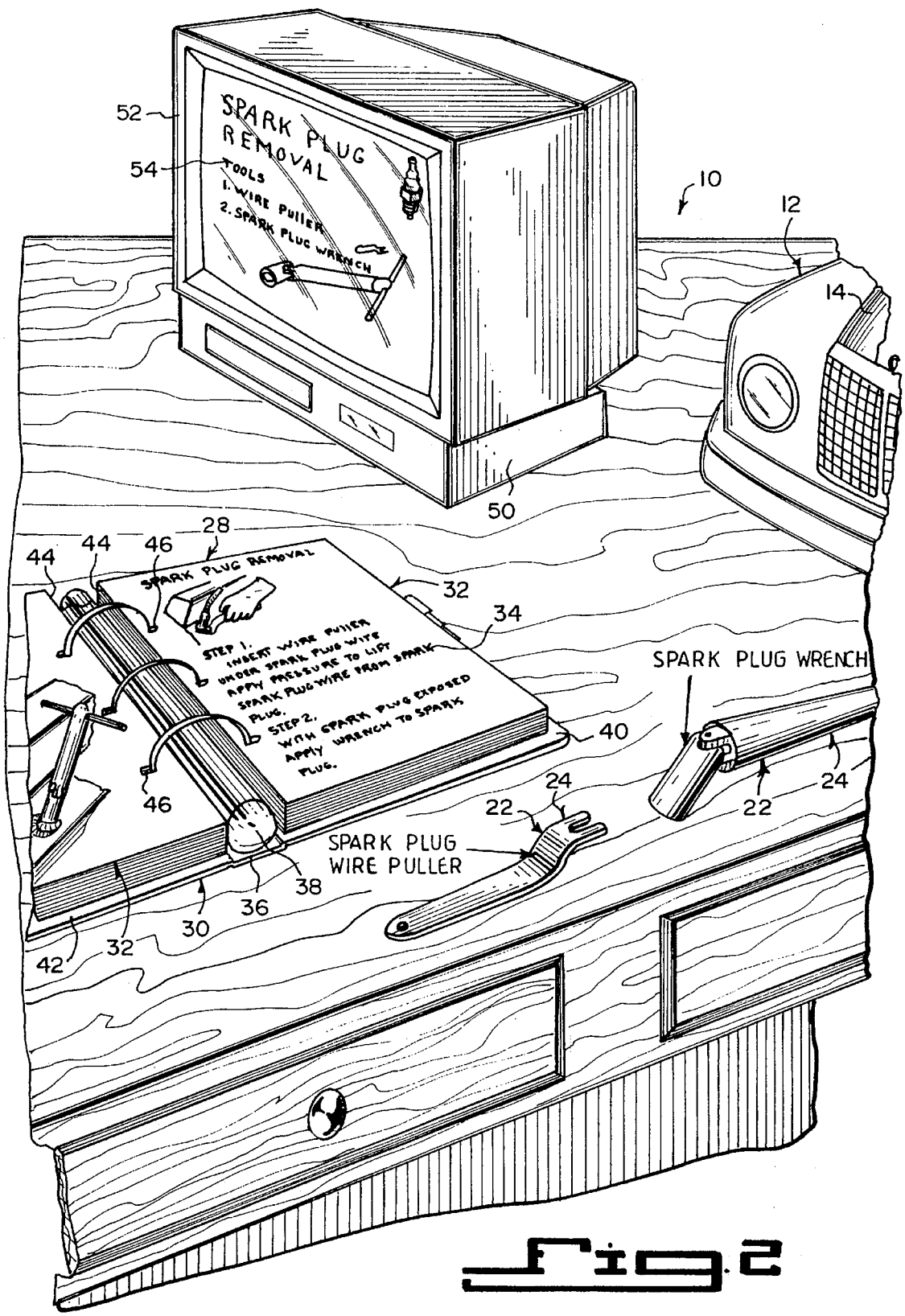

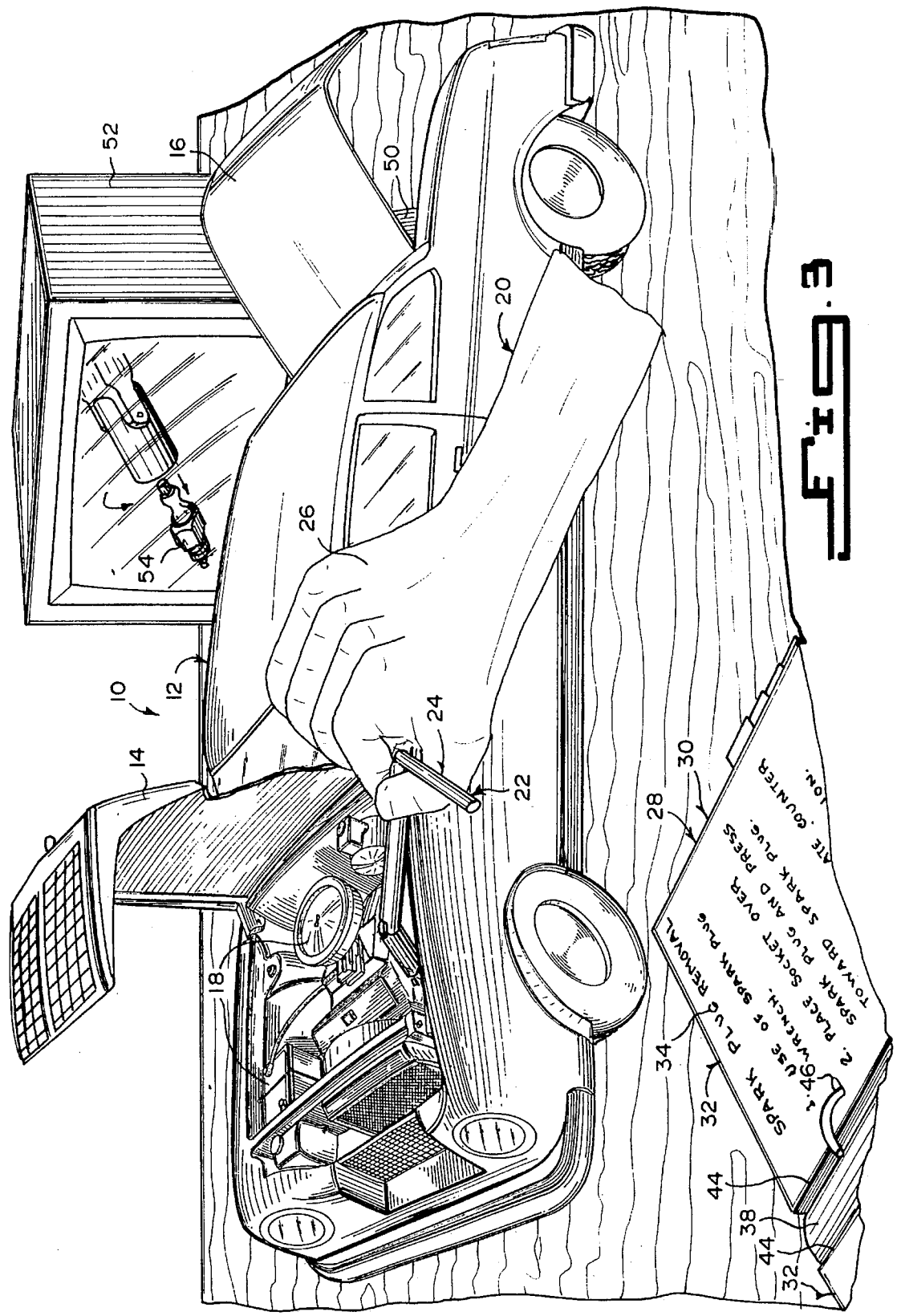

AUTOMOTIVE MAINTENANCE INSTRUCTION KIT

BACKGROUND OF THE INVENTION

1. Field of the Invention

The instant invention relates generally to auto repair manuals and more specifically it relates to an automotive maintenance instruction kit.

2. Description of the Prior Art

Numerous auto repair manuals have been provided in prior art that are adapted to supply written information on routine care and repair of various motor vehicles. While these units may be suitable for the particular purpose to which they address, they would not be as suitable for the purposes of the present invention as heretofore described.

SUMMARY OF THE INVENTION

A primary object of the present invention is to provide an automotive maintenance instruction kit that will overcome the shortcomings of the prior art devices.

Another object is to provide an automotive maintenance instruction kit, in which a miniature scale model automobile with removable parts exactly like those on a real automobile is supplied, so that a person using compatible repair tools for the removable parts can learn the proper maintenance for the real automobile.

An additional object is to provide an automotive maintenance instruction kit, in which a maintenance and repair manual in conjunction with a video tape can help assist in instructing the person of the proper maintenance for the real automobile.

A further object is to provide an automobile maintenance instruction kit that is simple and easy to use.

A still further object is to provide an automobile maintenance instruction kit that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 2 is a perspective view showing a portion of the miniature scale model automobile, the opened maintenance and repair manual, some repair tools and the video tape which is inserted into the video player being played on the television set.

FIG. 3 is a perspective view showing the miniature scale model automobile with its hood and trunk opened, the opened maintenance and repair manual, the television set playing and one of the repair tools in the hand of a person in engagement with one of the removable parts.

Similar reference characters denote corresponding features consistently throughout the attached drawings.

DETAILED DESCRIPTION OF THE PREFERRED EMBODIMENTS

Figure 1:
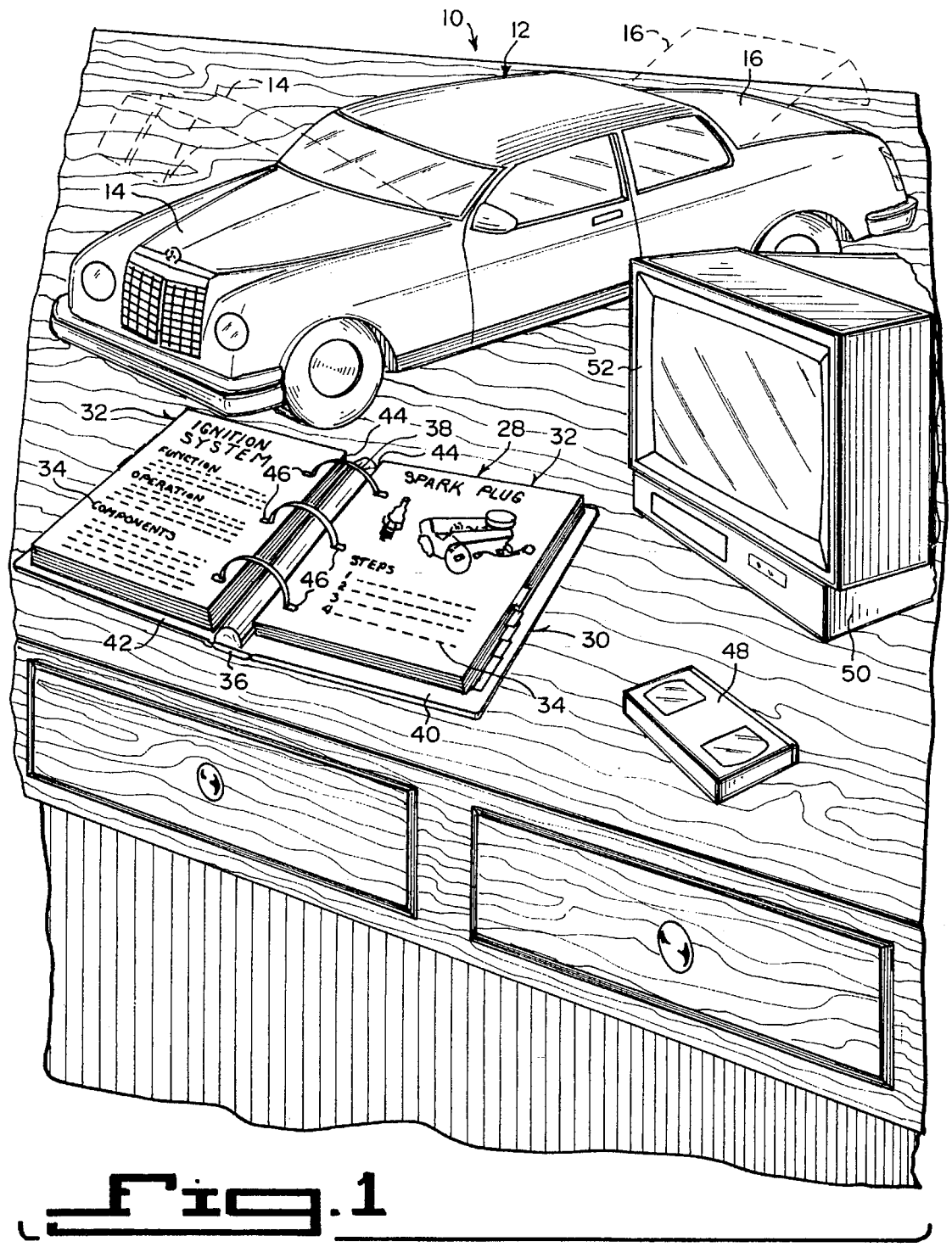
FIG. 1 is a perspective view showing some of the components of the instant invention being a miniature scale model automobile, an opened maintenance and repair manual with a video tape before insertion into a video player of a television set.

Turning now descriptively to the drawings, in which similar reference characters denote similar elements throughout the several views, FIGS. 1 through 3 illustrate an automotive maintenance instruction kit 10 comprising a miniature scale model automobile 12. A hood 14 on the miniature scale model automobile 12 is hinged thereto, so that the hood 14 can open and close. A trunk 16 on the miniature scale model automobile 12 is hinged thereto, so that the trunk 16 can open and close. A plurality of removable parts 18 within the miniature scale model automobile 12 are exactly like those on a real automobile, so that a person 20 can inspect and study the removable parts 18 therein.

A set of repair tools 22 are to be used by the person 20, for removing and installing the removable parts 18 in the miniature scale model automobile 12. Each repair tool 22 is a specific hand implement 24, used for a particular task when the person 20 is working with their hands 26. The person 20 can become skilled in removing and installing the removable parts 18 in the miniature scale model automobile 12.

A maintenance and repair manual 28 is to be used by the person 20, so as to provide information to inform the person 20 how to remove and install the removable parts 18 in the miniature scale model automobile 12. The maintenance and repair manual 28 contains a loose leaf type binder 30. A plurality of pages 32 are in the loose leaf type binder 30. Printed data 34 is on the pages 32, for supplying the information to the person 20.

The loose leaf type binder 30 includes a spine 36 with a three-ring release mechanism 38 on the spine 36. A back cover 40 is affixed to a first side of the spine 36. A front cover 42 is affixed to a second side of the spine 36. Each page 32 contains a margin 4 having three holes 46 to engage with the three-ring release mechanism 38 on the spine 36 of the loose leaf type binder 30. The printed data 34 includes a listing of various steps in removing and installing the removable parts 18 in the miniature scale model automobile 12 with the repair tools 22.

A video tape 48 is provided to be used by the person 20. The video tape 48 can be inserted into a video tape player 50 and played into a television set 52, so as to provide additional information to inform the person 20 on how to remove and install the removable parts 18 in the miniature scale model automobile 12. The additional information on the video tape 48 is visual data 54, showing how to follow the listing of various steps of the printed data 34 on the pages 32 in the loose leaf type binder 30 of the maintenance and repair manual 28.

Spark plug removal is illustrated in the drawings. Other types of maintenance can also be learned by the person 20 utilizing the kit 10. For example: tire changing, windshield wiper replacement, bulb changing, checking oil, transmission fluid and power steering fluid and maintaining and any other functions that the person 20 should know about in an automobile.

OPERATION OF THE INVENTION

To use the automotive maintenance instruction kit 10, the following steps should be taken:
1. Place the miniature scale model automobile 12 upon a table or other flat horizontal surface.
2. Determine what type of automotive maintenance should be performed.
3. Open the hood 14 or the trunk 16.
4. Grasp the repair tool 22 which is the specific hand implement 24.
5. Open the loose leaf type binder 30 to the proper pages 32 with its printed data 34 thereon.
6. Insert the video tape 48 into the video tape player 50 and view the matching visual data 54 on the television set 52 with the printed data 34 on the pages 32.
7. Use the specific hand implements 24 in removing and installing the removable parts 18 in the miniature scale model automobile 12.

LIST OF REFERENCE NUMBERS 10 automotive maintenance instruction kit
12 miniature scale model automobile
14 hood on 12
16 trunk on 12
18 removable parts of 12
20 person
22 repair tools
24 specific hand implement for 22
26 hand of 20
28 maintenance and repair manual
30 loose leaf type binder
32 page in 30
34 printed data on 32
36 spine of 30
38 three-ring release mechanism on 36
40 back cover on 36
42 front cover on 36
44 margin of 32
46 hole in 44
48 video tape
50 video tape player
52 television set
54 visual data on 52 from 50

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An automotive maintenance instruction kit comprising:
    a) a miniature scale model automobile;
    b) a hood on said miniature scale model automobile hinged thereto, so that said hood can open and close;
    c) a trunk on said miniature scale model automobile with the lid hinged thereto, so that said trunk can open and close;
    d) a plurality of totally removable parts within said miniature scale model automobile exactly like those on a real automobile, so that a person can inspect and study the removable parts therein;
    e) means comprising a set of compatible repair tools to be used by the person for removing and installing said removable parts in said miniature scale model automobile and teaching the use of said repair tools in connection with said removable parts for the proper maintenance of a real automobile, and each said repair tool being a specific hand implement used for a particular task so that the person can become skilled in removing and installing said removable parts;
    f) means comprising a maintenance and repair manual to be used by the person to provide information describing the steps how to remove and install said removable parts, said manual including a loose leaf type binder with pages having printed thereon for supplying said information; and
    g) means comprising a video tape for insertion into a video player for visually demonstrating the procedure for removing and installing said removable parts, the steps of said procedure corresponding to the steps described in said manual.

* * * * *